United States Patent
Burek et al.

(10) Patent No.: US 9,904,026 B2
(45) Date of Patent: *Feb. 27, 2018

(54) MODULE FOR OPTICAL FIBER INSTALLATION AND STORAGE AT CUSTOMER PREMISES

(71) Applicant: OFS Fitel, LLC, Norcross, GA (US)

(72) Inventors: Denis E Burek, Cumming, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,713

(22) Filed: Jan. 10, 2017

(65) Prior Publication Data
US 2017/0357070 A1    Dec. 14, 2017

Related U.S. Application Data

(63) Continuation-in-part of application No. 15/257,248, filed on Sep. 6, 2016.
(Continued)

(51) Int. Cl.
*G02B 6/44*    (2006.01)
*G02B 6/38*    (2006.01)

(52) U.S. Cl.
CPC ......... *G02B 6/4441* (2013.01); *G02B 6/3897* (2013.01); *G02B 6/4457* (2013.01); *G02B 6/4466* (2013.01)

(58) Field of Classification Search
CPC ...... G02B 6/4457; G02B 6/3897; G02B 6/46; G02B 6/4441; G02B 6/4446; G02B 6/4471; G02B 6/445; G02B 6/4452; G02B 6/4453
See application file for complete search history.

(56) References Cited

U.S. PATENT DOCUMENTS 6,215,938 B1 *  4/2001  Reitmeier ............ G02B 6/4441
                                                            385/134
8,254,740 B2 *  8/2012  Smith .................. G02B 6/3897
                                                            385/135
(Continued)

FOREIGN PATENT DOCUMENTS

WO    20150145055 A1    10/2015

OTHER PUBLICATIONS

OFS, Shuttered Adapter Invisifight(tm) Module, Product Description, two pages (2015).

*Primary Examiner* — Ryan Lepisto
*Assistant Examiner* — Erin Chiem
(74) *Attorney, Agent, or Firm* — Law Office of Leo Zucker

(57) ABSTRACT

A module for optical fiber installation and storage at customer premises has a base, and a fiber supply spool mounted for rotation on the base. An elongated adapter plate has a front end portion for mounting a connector adapter. A rear end portion of the adapter plate has first hinge parts at one side of the plate, and the fiber supply spool has second hinge parts for engaging the first hinge parts of the plate to define a hinge axis. The adapter plate can swivel about the hinge axis between a position where the plate lies flush on the supply spool and the spool can turn as fiber unwinds, and a position where a port of a connector adapter mounted on the plate is accessible for connection to an outside device when the module is closed, and the plate engages the module base to restrain the spool from rotation.

17 Claims, 8 Drawing Sheets

Related U.S. Application Data

(60) Provisional application No. 62/347,711, filed on Jun. 9, 2016.

(56) References Cited

U.S. PATENT DOCUMENTS

| | | |
|---|---|---|
| 8,818,157 B2 | 8/2014 | Burek et al. |
| 8,906,178 B2 | 12/2014 | Burek et al. |
| 2014/0161411 A1 | 6/2014 | Slater et al. |
| 2016/0097911 A1 | 4/2016 | George et al. |
| 2017/0139169 A1* | 5/2017 | Lecoq .................. G02B 6/4457 |

* cited by examiner

US 9,904,026 B2

MODULE FOR OPTICAL FIBER INSTALLATION AND STORAGE AT CUSTOMER PREMISES

CROSS REFERENCE TO RELATED APPLICATIONS

This application is a continuation-in-part (CIP) of our pending U.S. patent application Ser. No. 15/257,248 filed Sep. 6, 2016, and titled "Module for Optical Fiber Installation and Storage at Customer Premises." The present application also claims priority under 35 U.S.C. § 119(e) of U.S. Provisional Patent Application No. 62/347,711 filed Jun. 9, 2016, and titled "Alternative Route Solutions for Routing InvisiLight® Optical Fiber," the entire contents of which are incorporated by reference.

BACKGROUND OF THE INVENTION

Field of the Invention

The present invention relates to modules for installation and storage of optical fibers at customer premises, and particularly to modules that provide an optical connector adapter for connecting a supplied fiber to an optical device at the premises.

Discussion of the Known Art

The deployment of desktop optical network terminals (ONTs) at the premises of network users or customers is increasing. ONTs can be conveniently located, for example, near a TV set top box, an Internet modem, or other telecommunications device served by a fiber optic network. An optical fiber is routed at the premises to connect the ONT to a service module typically installed at an entrance to the premises by the network provider. The fiber routing at the premises should be performed at minimal cost and with little, if any, visibility to occupants when completed.

Wire staples may be used to fasten an optical fiber to a wall, molding, or other supporting surface quickly and at low cost over a determined routing path at the premises. Notwithstanding, customers often prefer to keep routed fibers and cables completely hidden from view inside their premises by using special moldings or conduits. Also, if not carefully inserted, staples can physically damage the supporting surface and impair or break an optical fiber. Therefore, for customers who want to hide all fibers and cables routed at their premises from view, expensive hardware and additional installation time are required.

A procedure that allows an installer to route and bond an optical fiber or cable over exposed surfaces, grooves, and/or corners at customer premises quickly and safely, and with little or no permanent visual impact, is therefore very desirable. Materials and instructions for performing such a procedure are available from OFS Fitel, LLC, under the registered mark InvisiLight®. See U.S. Pat. No. 8,906,178 (Dec. 9, 2014) and U.S. Pub. No. 2016/0097911 (Apr. 7, 2016), both of which are incorporated by reference. During an InvisiLight installation, a consumer grade, low odor, nonhazardous adhesive is applied along a determined routing path on walls, ceilings, or other supporting surfaces at the premises, the fiber or cable to be routed is pressed into the adhesive, and the adhesive is allowed to set. The use of a water based adhesive allows the installation to be performed in areas that lack ventilation, and excess adhesive can be cleaned away easily with soap and water. Moreover, the adhesive can be shipped worldwide without restrictions.

Known procedures for routing an optical fiber inside a home or multiple dwelling building usually require the installer to bond the fiber to a supporting surface along the routing path as the fiber is being unwound from a supply spool. The installer typically starts the routing from a provider service module located near an entrance to the premises, and ends at a termination point inside the premises, e.g., a fiber storage module located in the vicinity of an ONT. See U.S. Pat. No. 8,818,157 (Aug. 26, 2014), which is assigned to the assignee of the present invention and incorporated by reference. The mentioned '157 patent discloses an optical fiber storage module configured so that after a length of fiber is unwound from a supply spool and installed at the premises, the spool with any unwound fiber can be mounted and enclosed inside the module for storage. A connector adapter is provided in the module, and an inside end of the spooled fiber is connected to one side of the adapter. The other side of the adapter is accessible from outside the module for connection to an ONT or other device at the premises.

It is sometimes more expedient for an installer to reverse the above procedure by initially mounting the storage module in the vicinity of the termination point (e.g., an ONT) at the premises, and then drawing a sufficient length of fiber to route to the service module at the premises entrance from the supply spool. In such cases, it is convenient to allow the fiber supply spool to remain mounted and to rotate inside the module while the length of fiber is drawn from a payout area of the module. It is therefore important that the fiber not become snagged or bend critically as it unwinds from the spool and exits the payout area. For the mentioned InvisiLight fiber installations, it is also desirable for the fiber to be adhered to a supporting surface beneath the payout area of the module to avoid or reduce any adverse visual impact of the installed fiber at or near the module.

To expedite the installation procedure further, it is also desirable to connect the inside end of the spooled fiber to the connector adapter inside the module before the fiber is unwound for routing, and in a manner that allows the spool to turn freely together with the adapter while the fiber unwinds. See WO 2015/0145055 (Oct. 1, 2015) which is incorporated by reference.

SUMMARY OF THE INVENTION

According to the invention, a module for optical fiber installation and storage at customer premises includes a module body having a base, and a fiber supply spool constructed and arranged for mounting on the base for rotational movement while a length of fiber is unwound from the spool. An elongated, generally rectangular adapter plate has a front end portion formed and configured for mounting a connector adapter, and a rear end portion of the adapter plate has a pair of first hinge parts at one side of the plate.

The fiber supply spool has a pair of second hinge parts for engaging the first hinge parts on the adapter plate to define a hinge axis. The adapter plate can swivel about the hinge axis between a first position at which the plate lies flush on the spool and the spool is free to rotate as fiber unwinds from the spool, and a second position at which a port of a connector adapter mounted on the plate is accessible for connection to an outside device at the premises, and the plate engages the base of the module body to restrain movement of the spool.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms "user" and "customer" are used interchangeably to mean a natural person or a legal entity that uses telecommunication services offered by a network provider including, e.g., Internet access, telephony, television, or other information or data streams wherein the services require the installation of one or more optical fibers or cables at a location where the services are used by the person or entity (e.g., private home, apartment, or office). Further, the words "premises," "home," and "residence" are used interchangeably to mean the home, office, or other living unit where the services are provided for use by the person or entity.

Figure 1:
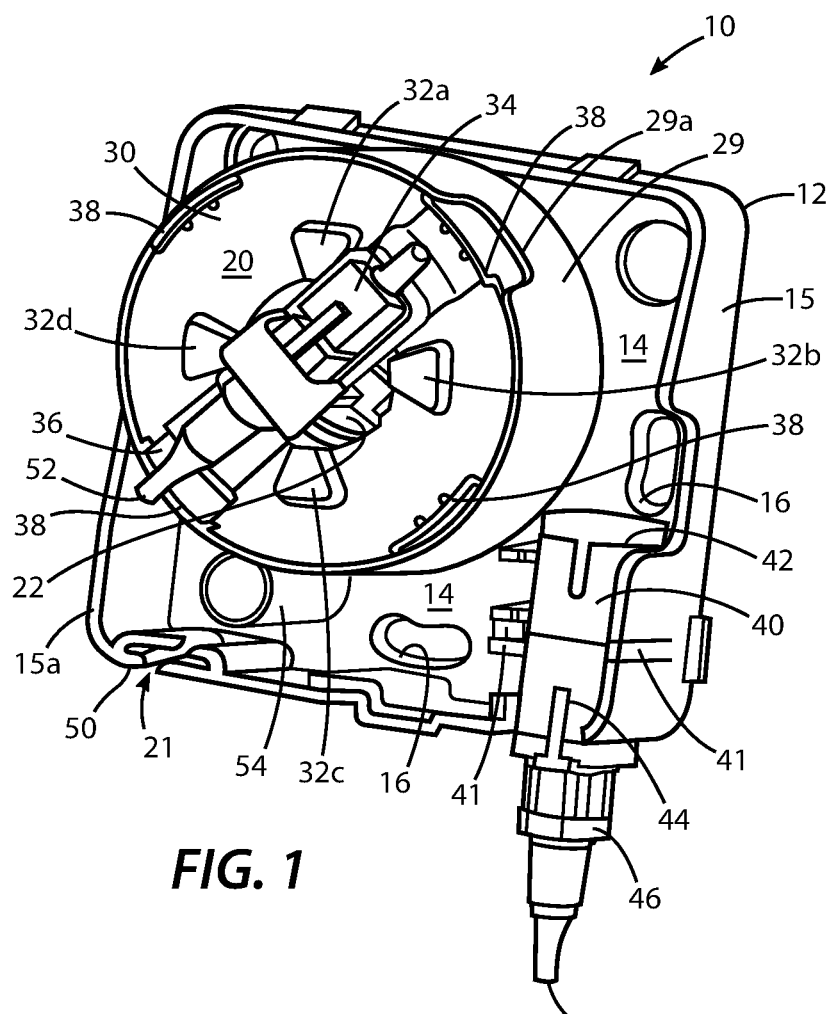
FIG. 1 is an isometric view of a first embodiment of an optical fiber storage module according to the invention, showing interior components of the module.

FIG. 1 is an interior view of a first embodiment of an optical fiber storage module 10 according to the invention. In FIG. 1, the module 10 has a generally square body 12 measuring approximately 3 inches by 3 inches (76.3 mm by 76.3 mm), and is made of polypropylene copolymer or equivalent material that meets all applicable fire and smoke safety codes. The module body 12 has a base 14 and a surrounding wall 15. The base 14 has several fastener openings 16 so that the module 10 can be mounted on a wall or other supporting surface at a user premises. The thickness of the base 14 and the wall 15 may be approximately 0.068 inch each.

Figure 2:
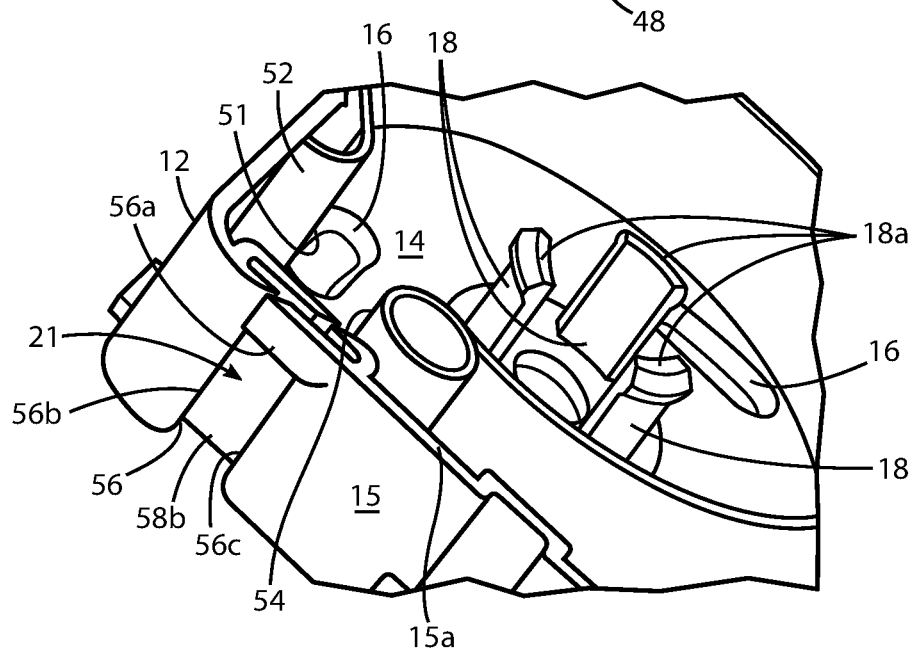
FIG. 2 is a view of a fiber payout area of the module in FIG. 1.

As seen more clearly in FIG. 2, a set of three arcuate retention members 18 project vertically upward in equi-circumferentially spaced relation from the base 14. The retention members 18 have lips 18a that protrude radially outward from the free ends of the members, and the members are configured to mount and retain a fiber supply spool 20 shown in FIGS. 1, 3, 5, and 6. The retention members 18 also allow the mounted spool 20 to rotate about them when a fiber is unwound from the spool for installation at the user premises. To comply with the fire and smoke safety codes, the spool 20 may be made from an alloy of polycarbonate and ABS (e.g., Wonderloy® PC-510) or equivalent material.

Figure 5:
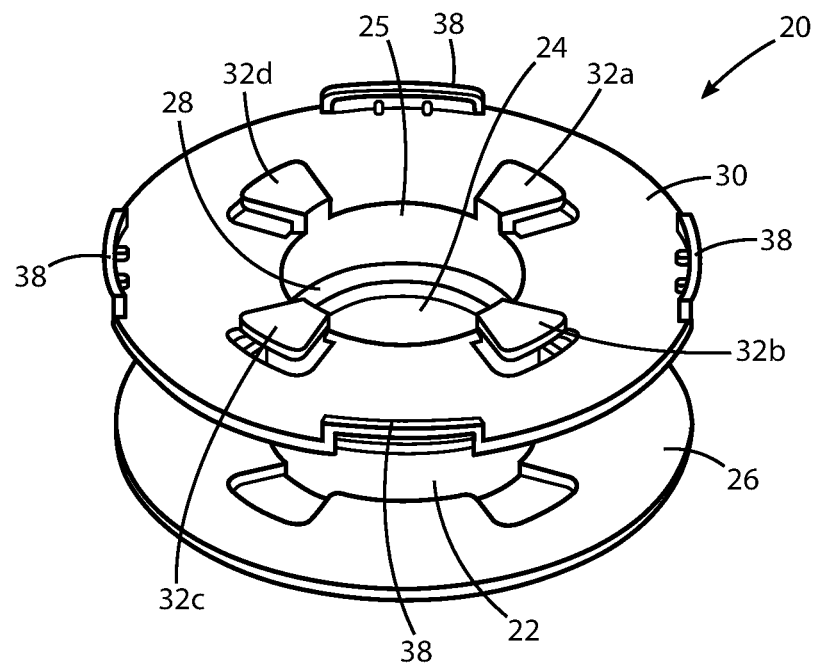
FIG. 5 is a view of the fiber supply spool.
Figure 6:
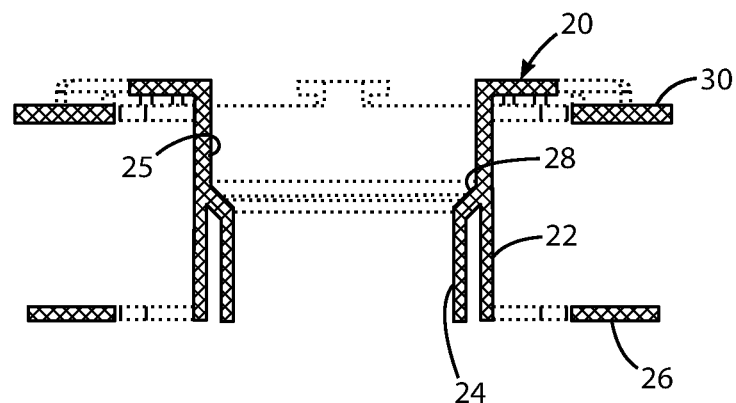
FIG. 6 is a cross sectional view of the supply spool in FIG. 5 as seen in a plane containing the spool axis.

The spool 20 includes a hub 22 having a lower, reduced diameter portion 24 shown in FIGS. 5 and 6, and an annular step 28 is formed between the reduced diameter portion 24 and an upper portion 25 of the hub 22. When a lower flange 26 of the spool 20 is centered over the retention members 18 and the spool is urged onto the members, the lips 18a at the ends of the members enter the reduced diameter portion 24 of the hub and deflect toward one another. When the lips 18a are at the top of the reduced diameter portion 24, they diverge radially onto the annular step 28 and act to retain the spool 20 in a mounted position at which the spool 20 can rotate about the retention members. To ensure the spool 20 rotates smoothly, stays concentric with the retention members 18 when fiber is unwound, and fiber is prevented from over spooling, a circular cylindrical wall 29 is formed on the module base 14 to surround and contain the spool. The diameter of the wall 29 preferably clears the outer periphery of the mounted spool 20 by a radial gap of only about 0.0075 inch (0.19 mm). One or more cutouts 29a are formed along the top edge of the wall 29 to facilitate mounting and removal of the spool 20 by hand.

The lower flange 26 and an upper flange 30 of the spool 20 have an outer diameter of approximately 2 inches each, and the height of the spool hub 22 is about 0.625 inch. The lower and the upper flanges 26, 30, and the hub 22 together form a first winding section of the spool 20 in which up to about 30 meters of a buffered optical fiber can be wound for supply. As seen in FIGS. 1 and 5, a set of four equi-circumferentially spaced flat retaining ears or guides 32a-d extend radially outward from the spool hub 22, parallel to the upper flange 30 and spaced approximately 0.040 inch from the flange 30. The retaining guides 32a-d and the upper flange 30 together form a second winding section of the spool 20 in which several turns of fiber can be wound before the remaining length of fiber is wound in the first winding section of the spool.

As seen in FIG. 1, a free end of fiber wound in the second winding section of the spool 20 is terminated in a connector 34 (e.g., type SC). The connector 34 is retained temporarily on the upper flange 30 of the spool by an elongated holder 36, and opposite ends of the holder 36 are secured in raised ears 38 on the circumference of the flange 30. The spool 20 can therefore be pre-wound with a single length of fiber several turns of which are wound in the second winding section and are terminated in the connector 34 in FIG. 1, and remaining turns of which are wound in the first winding section and terminated in another connector for connection to the network provider service module at the premises.

Figure 3:
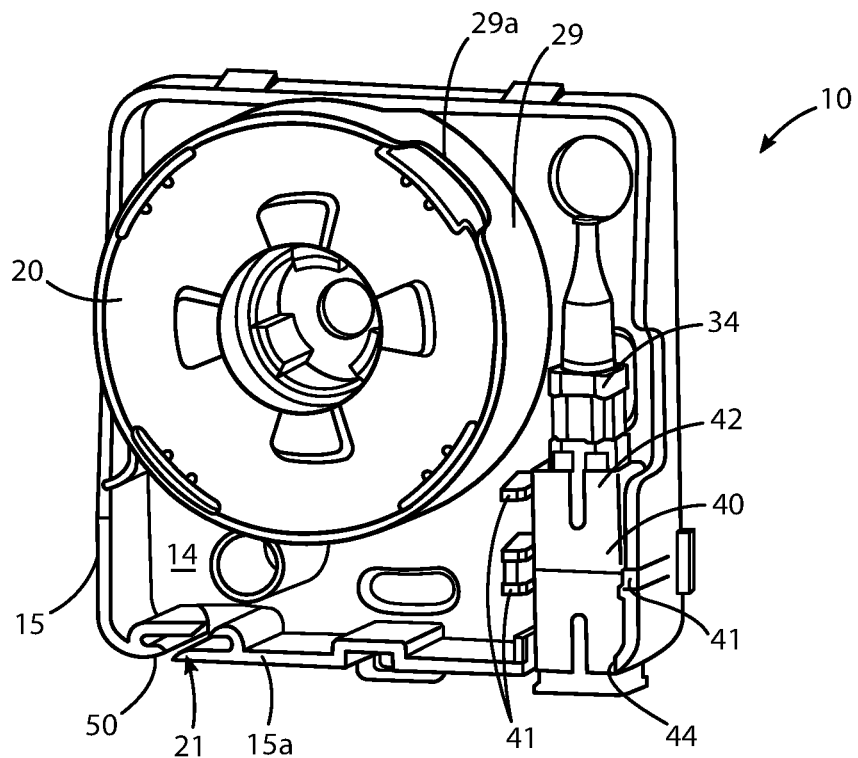
FIG. 3 is a view similar to FIG. 1, in which an optical connector mounted atop a fiber supply spool in FIG. 1 is mated to a connector adapter retained in the module.
Figure 4:
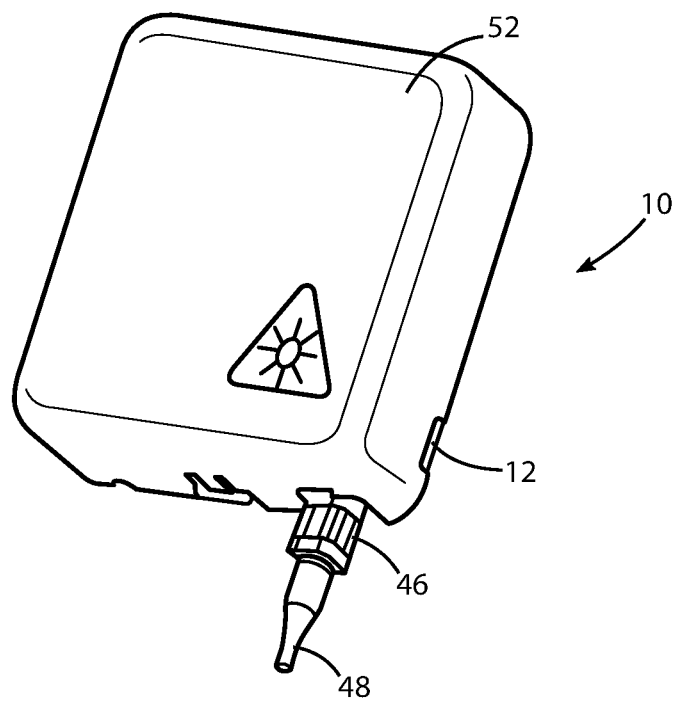
FIG. 4 is a view of the module in FIG. 1 when enclosed by a module cover.

The module 10 also houses a connector adapter 40 (e.g., type SC) that is seated within retaining guides 41 that project from the module base 14 and wall 15. See FIGS. 1 and 3. As shown in FIG. 3, a proximal end 42 of the adapter 40 is configured to mate with the connector 34 that terminates the fiber wound in the second winding section of the spool 20, after the connector 34 is removed from the holder 36 atop the spool 20 in FIG. 1. A distal end 44 of the adapter 40 is exposed through the module wall 15 to mate with an outside connector 46 that terminates one end of a jumper cable 48 leading to, e.g., an ONT or other optical device at the premises. See FIG. 4.

Before the connector 34 is mated to the proximal end 42 of the adapter 40, an installer determines the best routing path along which a fiber is to be installed between the storage module 10 and the provider service module at the premises. An end length of the fiber in the first winding section on the spool 20 is retrieved and threaded downward through a narrow slot 50 in a top edge 15a of the module wall 15 to enter a payout area 21 of the module. The required length of fiber is then drawn from the first winding section of the spool 20 through the payout area 21 as explained below with respect to FIGS. 2, 7, and 8. After the required length of fiber is drawn, the connector 34 is removed from its holder 36 atop the spool 20. Enough fiber is unwound from the second winding section of the spool to allow the connector 34 to engage the proximal end 42 of the adapter 40 without causing the fiber to break or critically bend. The module 10 including the spool 20 and the adapter 40 are enclosed by a cover 52 that snaps or otherwise fastens onto the module body 12. See FIG. 4.

Figure 7:
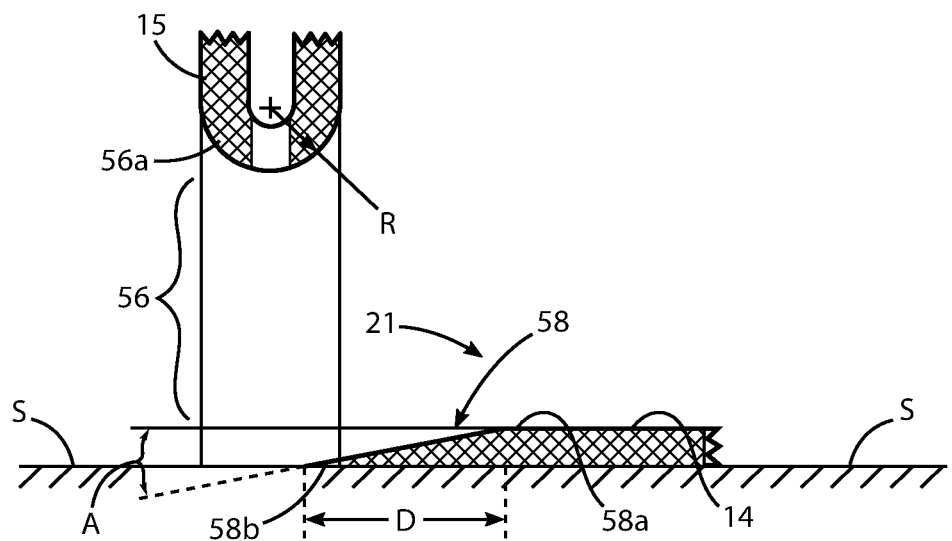
FIG. 7 is an enlarged, cross-sectional view of the fiber payout area in FIG. 2.
Figure 8:
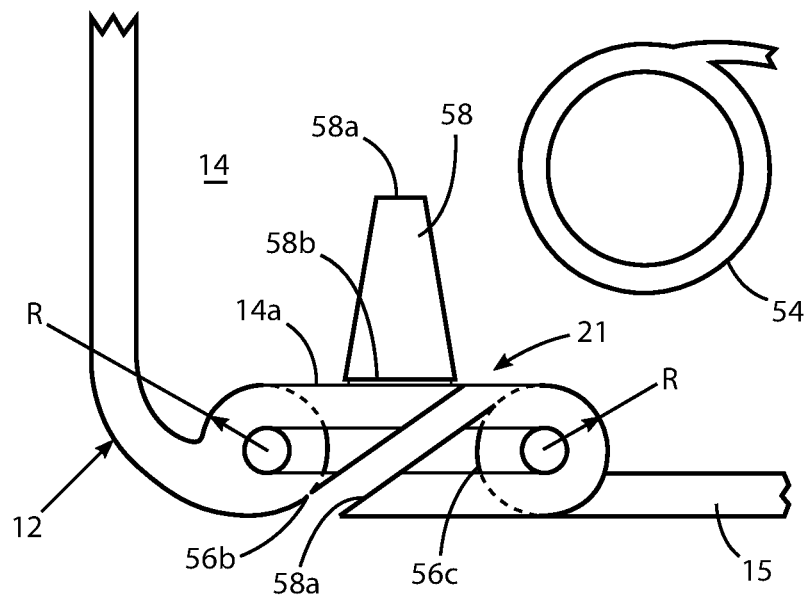
FIG. 8 is an enlarged, top view of the fiber payout area in FIG. 2.

FIGS. 2, 7, and 8 show details of the fiber payout area 21 of the module 10. In the illustrated embodiment, it is assumed that fiber is wound on the spool 20 in such a direction so that when the fiber is drawn through the payout area 21 of the module, the spool rotates counterclockwise as viewed in FIG. 1. As seen in FIG. 2, the cylindrical wall 29 that surrounds the spool 20 forms a circumferential gap 51 through which the fiber is guided when unwound from the spool, and the sides of the gap 51 are rounded at 52, 54.

At the module payout area 21, a rectangular fiber payout opening 56 is formed in the wall 15 of the module body 12. The opening 56 is bound by a top edge 56a, and left and right side edges 56b, 56c of the wall 15 as viewed in FIGS. 2 and 8. The side edges 56b, 56c are spaced apart by approximately 0.239 inch (6.07 mm), and all three edges 56a-c are rounded with a radius of curvature R of not less than a minimum bend radius specified for fiber supplied from the spool 20, for example, R=0.100 inch (2.54 mm) or greater. Accordingly, the fiber will not be snagged or bend critically when drawn out of the module 10 in a direction from the left, the right, or above the module payout opening 56.

As shown in FIG. 8, an approximately 0.400 inch (10.16 mm) wide edge 14a of the base 14 of the module body 12 is set back by a distance of, e.g., about 0.200 inch (5.08 mm) from the outside surface of the body wall 15 at the payout area 21. A trapezoidal shaped area 58 is extruded or cut into the base 14 such that the area 58 ramps downward at an angle A of about 8.25 degrees over a horizontal distance D of about 0.400 inch (10.16 mm) between an upper edge 58a of the area 58, and a lower edge 58b of the area that substantially coincides with the set back edge 14a of the base 14. The lower edge 58b of the area 58 is rounded and substantially flush with a supporting surface S beneath the base. See FIG. 7. The width of the upper edge 58a of the area 58 is, e.g., about 0.159 inch (4.04 mm), and the width of the lower edge 58b is, e.g., about 0.239 inch (6.07 mm).

The area 58 on the base 14 provides a gradual downward ramp for fiber traveling from the supply spool 20 toward the payout area 21 of the module when fiber is drawn out of the payout opening 56. Because the lower edge 58b of the area 58 is substantially flush with the supporting surface S, the drawn fiber can be adhered directly to the surface S beneath the base 14 at the payout opening 56, thus minimizing or avoiding any adverse visual impact of the fiber near the module 10 at the premises.

Figure 9:
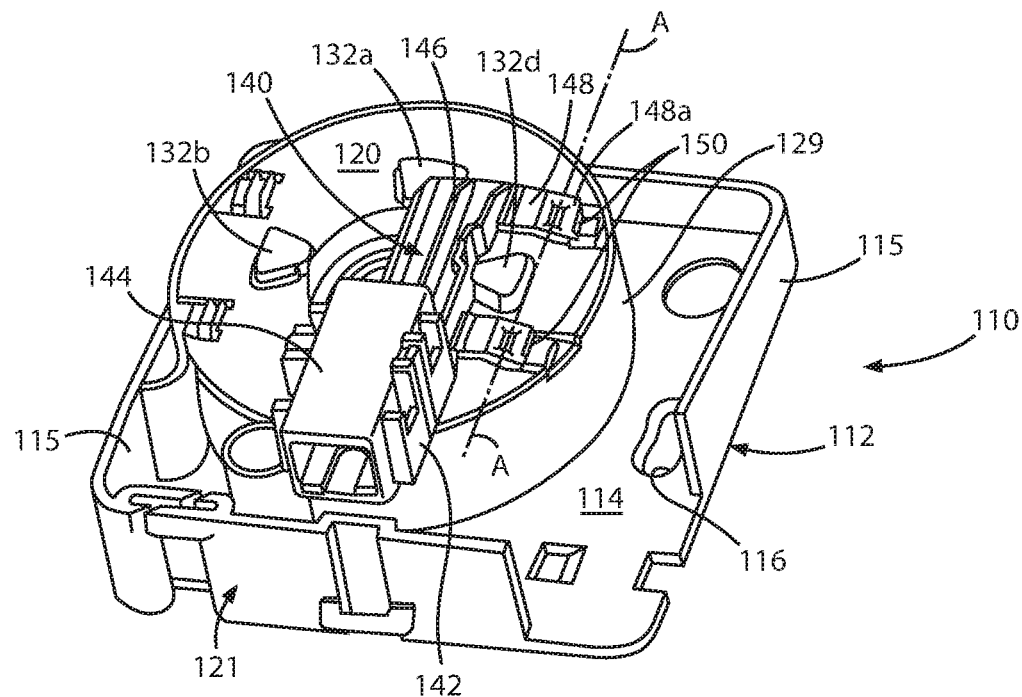
FIG. 9 is an isometric view of a second embodiment of an optical fiber storage module including a fiber supply spool and an adapter plate according to the invention, showing the adapter plate at a first position.
Figure 10:
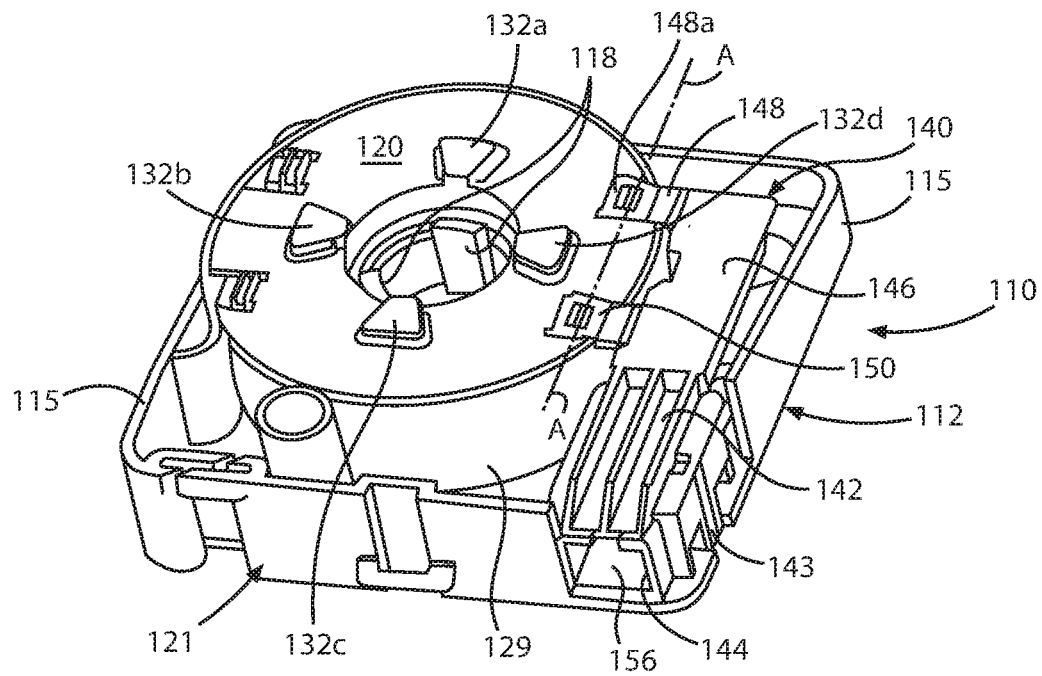
FIG. 10 is an isometric view of the module as in FIG. 9, showing the adapter plate at a second position.

FIGS. 9 and 10 are interior views of a second embodiment of an optical fiber storage module 110 according to the invention. Like the module 10 of the first embodiment, the module 110 has a generally square body 112 approximately 3 inches by 3 inches (76.3 mm by 76.3 mm), and is made of polypropylene copolymer or an equivalent material that meets all applicable fire and smoke safety codes at the premises. The module body 112 has a base 114 and a surrounding wall 115. The base 114 has several openings 116 for fasteners to allow the module 110 to be mounted flush on a wall or other supporting surface at the premises. The thicknesses of the base 114 and the wall 115 may each be approximately 0.068 inch.

Figure 11:
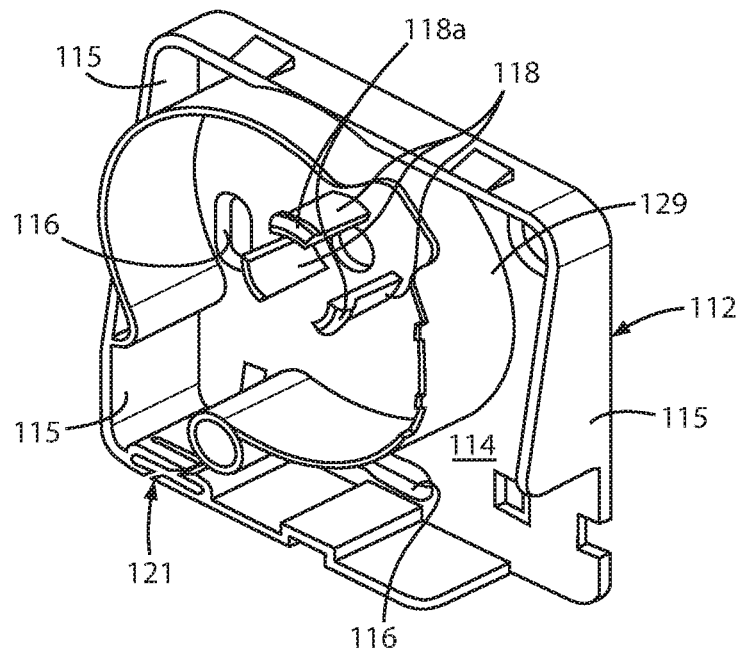
FIG. 11 is a view of a base of the module, with the fiber supply spool and the adapter plate removed.
Figure 12:
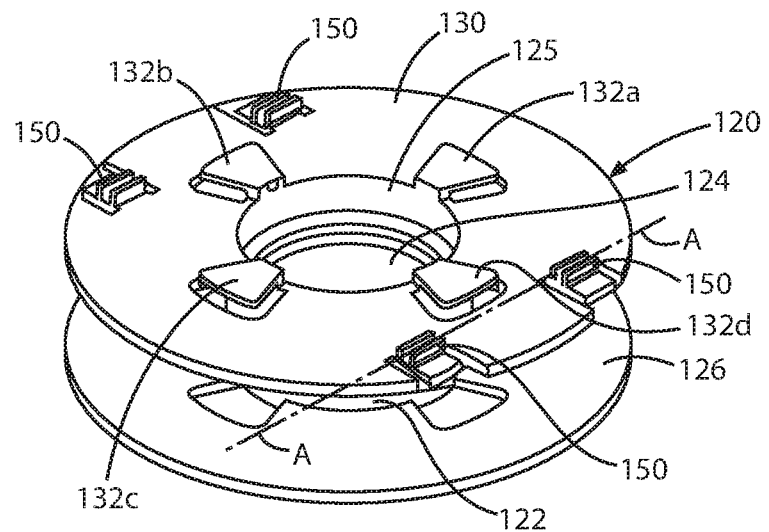
FIG. 12 is a view of the fiber supply spool in FIGS. 9 and 10.
Figure 13:
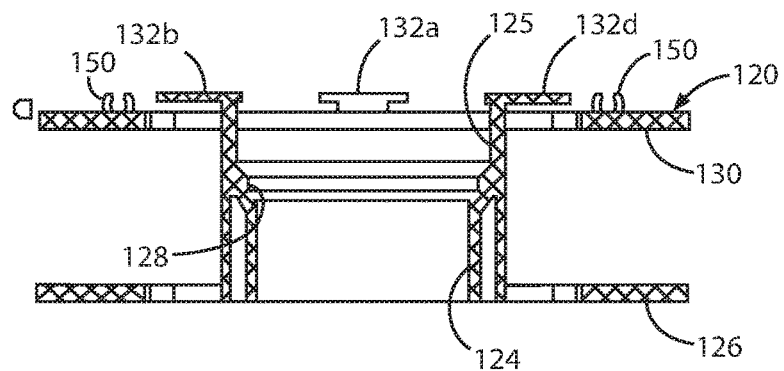
FIG. 13 is a cross sectional view of the supply spool in FIG. 12 as seen in a plane containing the spool axis.

As seen in FIGS. 10 and 11, a set of three retention members 118 project vertically upward in equi-circumferentially spaced relationship from the base 114. The retention members 118 have lips 118a that protrude radially outward from the free ends of the members, and the members are configured to mount and retain a fiber supply spool 120 as in FIGS. 9 and 10. Details of the spool 120 are illustrated in FIGS. 12 and 13. The retention members 118 also allow the mounted spool 120 to rotate about them when a fiber is unwound from the spool for installation at the user premises. To comply with fire and smoke safety codes, the spool 120 may be made from an alloy of polycarbonate and ABS (e.g., Wonderloy® PC-510) or equivalent material.

The spool 120 includes a hub 122 having a lower, reduced diameter portion 124, and an annular step 128 is formed between the reduced diameter portion 124 and an upper portion 125 of the hub 122. See FIGS. 12 and 13. When a lower flange 126 of the spool 120 is centered over the retention members 118 and the spool is urged onto the members, the lips 118a at the ends of the members enter the reduced diameter portion 124 of the hub and deflect toward one another. When the lips 118a are at the top of the reduced diameter portion 124, they diverge radially onto the annular step 128 and act to retain the spool 120 in a mounted position at which the spool 120 is free to rotate about the retention members. To ensure the spool 120 rotates smoothly, stays concentric with the retention members 118 when fiber is unwound, and that fiber is prevented from over spooling, a circular cylindrical wall 129 is formed on the module base 114 to surround and contain the spool in the radial direction. The inside diameter of the wall 129 preferably clears the outer periphery of the mounted spool 120 by a radial gap of about 0.0075 inch (0.19 mm).

The lower flange 126 and an upper flange 130 of the spool 120 have an outer diameter of approximately 2 inches each, and the height of the spool hub 122 is about 0.625 inch. The lower and the upper flanges 126, 130, and the hub 122 together form a first winding section of the spool 120 in which up to about 30 meters of a buffered optical fiber can be wound for supply. As seen in FIGS. 10, 12 and 13, a set of four equi-circumferentially spaced flat retaining ears or guides 132a-d extend radially outward from the spool hub 122, over and parallel to the upper flange 130, and spaced approximately 0.040 inch above the flange 130. The retaining guides 132a-d and the upper flange 130 together form a second winding section of the spool 120 in which several turns of a fiber can be wound before the remaining fiber is wound in the first winding section of the spool.

Figure 14:
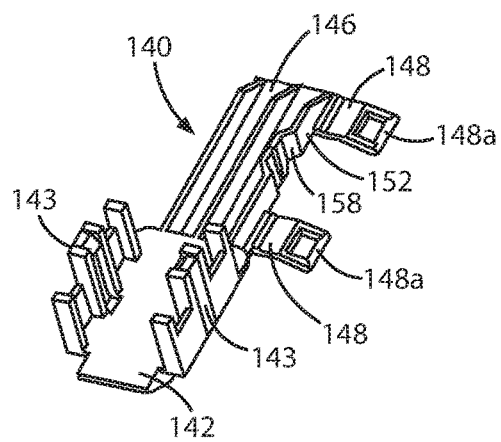
FIG. 14 is an isometric view of the adapter plate when at the first position in FIG. 9.
Figure 15:
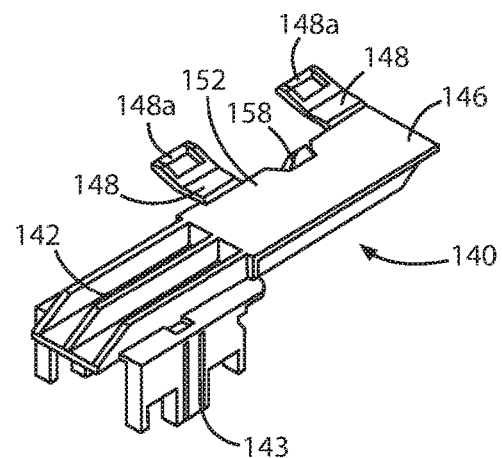
FIG. 15 is a view of the adapter plate when at the second position in FIG. 10.

FIG. 14 shows an elongated, generally rectangular adapter plate 140 oriented at a first position in the storage module 110 as shown in FIG. 9. FIG. 15 shows the adapter plate 140 oriented at a second position in the module 110 as shown in FIG. 10, according to the invention. The plate 140 can be molded from polypropylene copolymer or an equivalent material that complies with fire and smoke safety codes at the premises. A front end portion 142 of the adapter plate 140 is formed with two parallel sets of retaining posts 143 between which a connector adapter 144 (e.g., type SCA) can be mounted and retained on the plate as seen in FIGS. 9 and 10.

The adapter plate 140 also has a rear end portion 146 from which a pair of hinge arms 148 project parallel to one another from a long side 152 of the plate. Each hinge arm 148 has a first hinge part 148a at the free end of the arm, for example, a hinge pin formed by making a square or rectangular opening near the end of the arm as seen in FIGS. 14 and 15, and rounding the pin at the end of the arm. The upper flange 130 of the fiber supply spool 120 has second hinge parts 150, for example, hinge knuckles for engaging the hinge pins 148a of the adapter plate 140 to define a hinge axis A. See FIGS. 9, 10, and 12.

Typical overall dimensions for the adapter plate 140 excluding the hinge arms 148 are, for example, about 2.365 inches long and about 0.706 inch wide, and wherein each hinge arm 148 extends about 0.315 inch from the long side 152 of the plate 140. For structural strength and rigidity and as shown in FIGS. 10 and 15, the front end portion 142 of the adapter plate 140 is ribbed lengthwise on the side of the plate opposite the retaining posts 143, and the rear end portion 146 of the plate 140 is ribbed lengthwise on the same side of the plate on which the retaining posts 143 are disposed.

Figure 17:
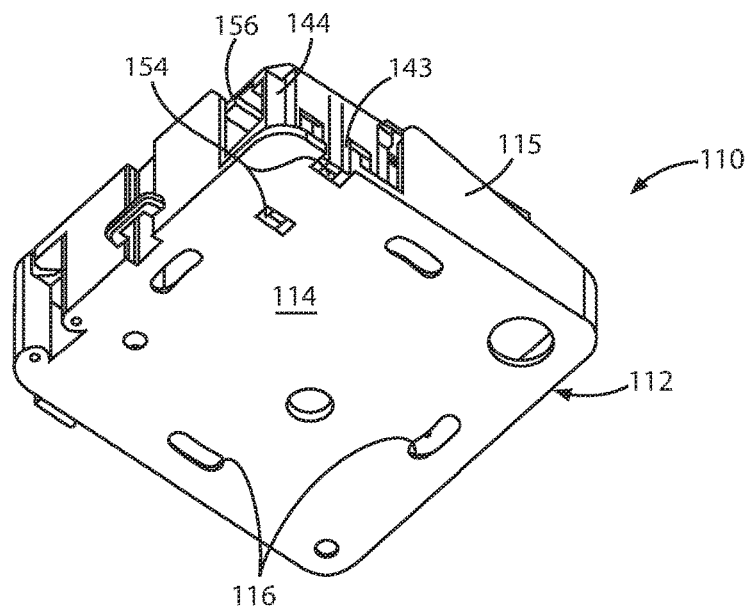
FIG. 17 is an isometric view of the module as seen from beneath the module base.

Accordingly, the adapter plate can swivel about the hinge axis A by approximately 180 degrees between the first position in FIG. 9 where the adapter plate 140 lies substantially flush on the upper spool flange 130 and the spool 120 together with the adapter plate 140 can turn freely when fiber is unwound, and the second position in FIG. 10 where a first port 156 of a connector adapter 144 mounted on the adapter plate is accessible for connection to an outside device at the premises when the module 110 is closed. Also, when the adapter plate 140 is in the second position in FIG. 10, and as shown in FIG. 17, one or more of the retaining posts 143 on the front end portion 142 of the plate are seated in corresponding cutouts 154 in the module base 114, so that the fiber supply spool 120 is restrained by the adapter plate 140 from rotation on the module base 114.

As shown in FIG. 12, two pairs of the second hinge parts 150 are provided on the upper spool flange 130. The pairs of second hinge parts 150 are diametrically opposed to one another, and each of the parts is located near the circumference of the spool flange 130 so that the hinge axis A extends, at most, a relatively short distance from the circumference of the flange. Therefore, once a determined length of fiber is unwound from the spool 120, it is unnecessary to rotate the spool farther by more than a quarter turn in order that (a) the first hinge parts 148a on the adapter plate 140 can engage a pair of second hinge parts 150 on the upper spool flange 130 when the plate is at the second position in FIG. 10, and (b) regardless of which pair of second hinge parts are engaged by the first hinge parts, the plate lies substantially flush with the upper spool flange 130 when the plate is swung from the second position in FIG. 10 to the first position in FIG. 9.

Figure 16:
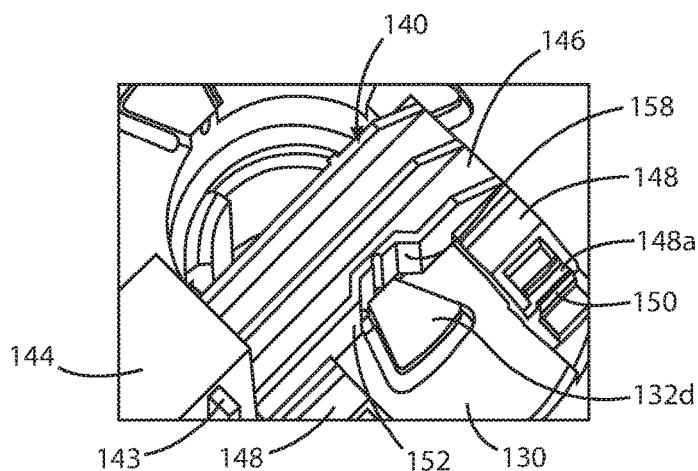
FIG. 16 is an enlarged partial view of the adapter plate at the first position in FIG. 9, showing a rear end portion of the plate seated flush on the fiber supply spool.

FIG. 16 is an enlarged view of the rear end portion 146 of the adapter plate 140 when the plate is oriented at the first position as in FIGS. 9 and 14. A notch 158 is formed in the long side 152 of the adapter plate 140, between the two hinge arms 148 that extend from the side 152. When the adapter plate 140 is swung to the first position onto the upper spool flange 130, the retaining guide 132d on the flange fits tightly in the notch 158 and thus acts to hold the adapter plate 140 in place when the supply spool 120 rotates as fiber is unwound.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A module for optical fiber installation and storage at customer premises, comprising:
a module body including a base constructed and arranged for mounting the module flush on a supporting surface at the premises;
retention members projecting upward from the base;
a fiber supply spool constructed and arranged for mounting on the retention members for rotational movement about the retention members as a length of
fiber is unwound from the spool for installation at the premises;
an elongated, generally rectangular adapter plate having a front end portion formed and configured for mounting a connector adapter, and a rear end portion having a pair of first hinge parts that extend from one side of the adapter plate, and one or more retaining posts extending beneath the front end portion; and
the fiber supply spool has a pair of second hinge parts configured to engage the first hinge parts of the adapter plate to define a hinge axis, so that the adapter plate can swivel about the hinge axis between a first position at which the adapter plate lies flush with the spool and the spool is free to rotate when fiber is unwound, and a second position approximately 180 degrees about the hinge axis from the first position at which a first port of a connector adapter mounted on the adapter plate is accessible for connection to an outside device, and the retaining posts beneath the front end portion of the adapter plate engage corresponding cutouts in the base of the module body to restrain the spool from rotation about the retention members on the base of the module body.

2. A module according to claim 1, wherein the first hinge parts include hinge pins, and the second hinge parts comprise hinge knuckles.

3. A module according to claim 2, wherein the first hinge parts include hinge arms each of which extends about 0.315 inch from the one side of the adapter plate, and the hinge pins are formed at free ends of the arms.

4. A module according to claim 1, wherein the fiber supply spool has a hub, a lower flange at a first axial end of the hub, and an upper flange at a second axial end of the hub opposite the first axial end, wherein the hub, the lower flange, and the upper flange define a first winding section of the spool for containing a length of fiber sufficient to route between the module and a service module associated with a premises at which the module is deployed.

5. A module according to claim 4, wherein the pair of second hinge parts are disposed on the upper flange of the fiber supply spool.

6. A module according to claim 5, wherein the pair of second hinge parts are disposed near the circumference of the upper flange of the supply spool.

7. A module according to claim 6, including a second pair of second hinge parts disposed near the circumference of the upper flange of the supply spool and in diametrically opposed relationship to the first pair of second hinge parts.

8. A module according to claim 7, wherein the first hinge parts comprise hinge pins, and the second hinge parts comprise hinge knuckles.

9. A module according to claim 4, wherein the upper flange of the fiber supply spool has a set of equi-circumferentially spaced retaining guides that extend radially outward from the hub, and the retaining guides and the upper flange form a second winding section of the spool for containing a length of fiber sufficient to connect between the spool and a second port of a mounted connector adapter inside the module.

10. A module according to claim 9, wherein the first winding section of the fiber supply spool contains a length of fiber sufficient to route between the module and the provider service module associated with the premises, and the second winding section of the spool contains a length of fiber sufficient to connect between the spool and the second port of the connector adapter.

11. A module according to claim 9, wherein the one side of the rear end portion of the adapter plate from which the first hinge parts extend has a notch for engaging one of the retaining guides on the upper flange of the fiber supply spool when the plate is at the first position.

12. A module according to claim 1, wherein the one side of the rear end portion of the adapter plate from which the first hinge parts extend is formed to engage a part of the fiber supply spool when the adapter plate is at the first position.

13. A module according to claim 1, including a removable cover for enclosing the body of the module including the fiber supply spool and a connector adapter when mounted on the front end portion of the adapter plate, and when the plate is at the second position.

14. A module according to claim 1, including a connector adapter for mounting on the front end portion of the adapter plate.

15. A module according to claim 14, wherein the connector adapter is a type SCA adapter.

16. A module for optical fiber installation and storage at customer premises, comprising:
    a module body including a base;
    a fiber supply spool constructed and arranged for mounting on the base for rotational movement as a length of fiber is unwound from the spool;
    an elongated, generally rectangular adapter plate having a front end portion formed and configured for mounting a connector adapter, and a rear end portion having a pair of first hinge parts that extend from one side of plate; and
    the fiber supply spool has a pair of second hinge parts configured to engage the first hinge parts of the adapter plate to define a hinge axis, so that the plate can swivel about the hinge axis between a first position at which the plate lies flush with the spool and the spool is free to rotate when fiber is unwound, and a second position at which a first port of a connector adapter mounted on the plate is accessible for connection to an outside device and the plate engages the base of the module body to restrain the spool from rotation;
    wherein the first hinge parts include hinge arms each of which extends about 0.315 inch from the one side of the adapter plate, and hinge pins formed at free ends of the hinge arms, and wherein the second hinge parts comprise hinge knuckles.

17. A module for optical fiber installation and storage at customer premises, comprising:
    a module body including a base;
    a fiber supply spool constructed and arranged for mounting on the base for rotational movement as a length of fiber is unwound from the spool;
    an elongated, generally rectangular adapter plate having a front end portion formed and configured for mounting a connector adapter, and a rear end portion having a pair of first hinge parts that extend from one side of plate; and
    the fiber supply spool has a pair of second hinge parts configured to engage the first hinge parts of the adapter plate to define a hinge axis, so that the plate can swivel about the hinge axis between a first position at which the plate lies flush with the spool and the spool is free to rotate when fiber is unwound, and a second position at which a first port of a connector adapter mounted on the plate is accessible for connection to an outside device and the plate engages the base of the module body to restrain the spool from rotation;
    wherein the fiber supply spool has a hub, a lower flange at a first axial end of the hub, and an upper flange at a second axial end of the hub opposite the first axial end, wherein the hub, the lower flange, and the upper flange define a first winding section of the spool for containing a length of fiber sufficient to route between the module and a service module associated with a premises at which the module is deployed;
    the upper flange of the fiber supply spool has a set of equi-circumferentially spaced retaining guides that extend radially outward from the hub, and the retaining guides and the upper flange form a second winding section of the spool for containing a length of fiber sufficient to connect between the spool and a second port of a mounted connector adapter inside the module; and
    wherein the one side of the rear end portion of the adapter plate from which the first hinge parts extend has a notch for engaging one of the retaining guides on the upper flange of the fiber supply spool when the plate is at the first position.

* * * * *